United States Patent
Nieuwoudt et al.

(10) Patent No.: US 9,909,824 B2
(45) Date of Patent: Mar. 6, 2018

(54) DISTRIBUTOR IN MASS TRANSFER COLUMN AND METHOD OF USE

(71) Applicant: Koch-Glitsch, LP, Wichita, KS (US)

(72) Inventors: Izak Nieuwoudt, Wichita, KS (US); Darran Matthew Headley, Valley Center, KS (US); Patrick K. Quotson, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 49 days.

(21) Appl. No.: 14/811,700

(22) Filed: Jul. 28, 2015

(65) Prior Publication Data

US 2015/0330726 A1    Nov. 19, 2015

Related U.S. Application Data

(63) Continuation of application No. 14/066,295, filed on Oct. 29, 2013, now Pat. No. 9,089,787.

(Continued)

(51) Int. Cl.
  *B01F 3/04*   (2006.01)
  *F28F 25/04*  (2006.01)
  (Continued)

(52) U.S. Cl.
  CPC ............. *F28F 25/04* (2013.01); *B01D 3/008* (2013.01); *B01D 3/20* (2013.01); *B01F 3/04007* (2013.01); *Y10T 137/0318* (2015.04)

(58) Field of Classification Search
  CPC ....... B01D 3/20; B01D 3/008; B01F 3/04007; F28F 25/04; F28F 25/08; F28F 25/087; Y10T 137/0318

(Continued)

(56) References Cited

U.S. PATENT DOCUMENTS 3,158,171 A * 11/1964 Eckert .................... B01D 3/008
                                                137/262
3,360,246 A * 12/1967 Eckert .................... B01D 3/008
                                                 261/97

(Continued)

FOREIGN PATENT DOCUMENTS

DE    3013783 A1    10/1981
DE    3409524 C1     9/1985

(Continued)

OTHER PUBLICATIONS

European Search Report—dated Jun. 24, 2016 on corresponding European application No. 13863615.4.

(Continued)

*Primary Examiner* — Charles Bushey (57) ABSTRACT

A liquid distributor is provided for receiving and distributing a liquid stream in a mass transfer column. The liquid distributor has a plurality of elongated primary troughs and a plurality of secondary troughs that are positioned adjacent the primary troughs at a location to receive at least some of the individual primary discharge streams from the primary troughs. Splash baffles are spaced a preselected distance from liquid discharge holes in the side walls of the secondary troughs to receive at least some of the individual secondary discharge streams and cause a lateral spreading thereof as the individual second discharge streams descend along the splash baffles and drip from lower edges thereof.

20 Claims, 6 Drawing Sheets

Related U.S. Application Data (60) Provisional application No. 61/737,517, filed on Dec. 14, 2012.

(51) Int. Cl.
 *B01D 3/00* (2006.01)
 *B01D 3/20* (2006.01)

(58) Field of Classification Search
 USPC .................................................. 261/97, 110
 See application file for complete search history.

(56) References Cited

U.S. PATENT DOCUMENTS

| | | | | |
|---|---|---|---|---|
| 3,491,792 A | * | 1/1970 | Eckert | B01D 3/16 137/561 R |
| 3,937,769 A | * | 2/1976 | Strigle, Jr. | B01D 3/008 261/114.1 |
| 4,264,538 A | * | 4/1981 | Moore | B01D 3/18 239/193 |
| 4,569,364 A | * | 2/1986 | Keller | B01D 3/008 137/244 |
| 4,816,191 A | | 3/1989 | Berven et al. | |
| 4,855,089 A | * | 8/1989 | Michels | B01D 3/008 239/542 |
| 5,051,214 A | * | 9/1991 | Chen | B01D 3/008 261/97 |
| 5,061,407 A | * | 10/1991 | Nutter | B01D 53/185 261/96 |
| 5,906,773 A | | 5/1999 | Hausch et al. | |
| 6,293,526 B1 | | 9/2001 | Fischer et al. | |
| 6,575,437 B2 | | 6/2003 | Fischer et al. | |
| 6,722,639 B2 | * | 4/2004 | Ender | B01D 3/008 261/110 |
| 7,125,004 B2 | * | 10/2006 | Dollie | B01D 3/008 261/110 |
| 7,712,728 B2 | | 5/2010 | Kehrer | |
| 9,089,787 B2 | * | 7/2015 | Nieuwoudt | B01D 3/20 |
| 2005/0189663 A1 | | 9/2005 | Dollie | |
| 2008/0245416 A1 | | 10/2008 | Meier et al. | |

FOREIGN PATENT DOCUMENTS

| | | |
|---|---|---|
| JP | 1974-033729 B | 9/1974 |
| JP | 1992-057251 U | 5/1992 |
| JP | H08261690 | 10/1996 |

OTHER PUBLICATIONS

International Search Report and Written Opinion for PCT/US2013/067677, dated Mar. 6, 2014, 6 pages.

Office Action dated Apr. 25, 2017 on corresponding Taiwan application No. 102143066.

\* cited by examiner

DISTRIBUTOR IN MASS TRANSFER COLUMN AND METHOD OF USE

RELATED APPLICATIONS

This application is a continuation of U.S. application Ser. No. 14/066,295, filed Oct. 29, 2013, now U.S. Pat. No. 9,089,787, which claims priority to U.S. Provisional Patent Application No. 61/737,517, filed Dec. 14, 2012, with the above-identified applications incorporated by reference herein in their entireties.

BACKGROUND OF THE INVENTION

The present invention relates generally to columns in which mass transfer and heat exchange occur and, more particularly, to liquid distributors used in such columns and methods of liquid distribution using such liquid distributors.

As used herein, the term "mass transfer column" refers to a column in which mass transfer and/or heat exchanger occur. Examples of mass transfer columns include distillation, absorption, stripping, and extraction columns.

In mass transfer columns, one or more liquid and/or vapor streams are brought into contact with each other to effect mass transfer and/or heat exchange between the liquid and/or vapor streams. Beds of structured or random packing are normally used in such mass transfer columns to facilitate intimate contact between the liquid and/or vapor streams and thereby enhance the desired mass transfer and/or heat exchange between the streams. In liquid/vapor systems, the liquid stream descends through the bed of packing and the vapor stream ascends through the packing bed. Similarly, in liquid/liquid and vapor/vapor systems, the denser phase descends through the bed and the less dense phase ascends through the bed.

Uniform distribution of the descending liquid stream across the horizontal cross section of the bed of structured or random packing is important in order to maintain a uniform interaction between the liquid stream and the ascending vapor stream. Various types of liquid distributors are used in an attempt to provide a uniform distribution of the liquid stream as it enters the top of the bed of packing material. In one type of liquid distributor, a feed box or parting box receives a liquid stream from an overlying collector or a feed line and distributes it to a number of elongated and parallel troughs that underlie or extend horizontally from the parting box. Spaced-apart holes are formed in the side walls of the troughs to allow liquid to exit the troughs in individual liquid streams. Splash baffles are spaced outwardly from and parallel to the side walls of the troughs so that the individual liquid streams exiting the troughs through the holes are directed onto the splash baffles. The individual liquid streams then descend along and spread across the splash baffles before dripping off the lower edge of the baffles into the bed of packing material. Examples of liquid distributors of this type are shown in U.S. Pat. Nos. 6,722,639 and 7,125,004.

When designing the liquid distributors described above, the number and size of the holes in the side walls of the trough is selected based on the anticipated volumetric flow rate of the liquid stream into the troughs. The total open area presented by the holes must be designed to permit a sufficient liquid head to develop within the troughs and thereby generate the necessary force to cause the individual liquid streams to exit the holes with enough momentum to reach the outwardly-spaced splash baffles. When the designed liquid volumetric flow rate is low, the total flow capacity of the holes must be reduced to allow a sufficient liquid head to develop in the troughs. This reduction in flow capacity can be achieved by reducing the size of the holes and/or by increasing the spacing between adjacent holes to reduce the total number of holes. Both of these options create potential disadvantages. If smaller holes are selected, they are more likely to become clogged, thereby creating regions on the splash baffles and in the underling packing that are not wetted by the individual liquid streams. Similarly, if the spacing between the holes is increased, the individual liquid streams may not merge as they descend along and spread across the splash baffles. A need has thus developed for a liquid distributor that overcomes these potential disadvantages.

SUMMARY OF THE INVENTION

In one aspect, the present invention is directed to a liquid distributor for receiving and distributing a liquid stream, such as to an underlying layer of mass transfer devices. The liquid distributor comprises a plurality of elongated primary troughs positioned in side-by-side and generally parallel relationship, each of the primary troughs having spaced apart side walls interconnected by a floor for receiving and allowing the accumulation of a portion of the liquid stream within each primary trough. A plurality of liquid discharge holes are provided in at least one of the side walls of each of said primary troughs so that the portion of the liquid stream that has accumulated within each primary trough may be discharged from the associated trough in individual primary discharge streams. The liquid distributor also includes a plurality of secondary troughs having spaced apart side walls interconnected by a floor for receiving and allowing the accumulation of a portion of the primary discharge streams within each secondary trough. Each secondary trough is positioned adjacent one of the primary troughs at a location to receive at least some of the individual primary discharge streams from one of the primary troughs. A plurality of liquid discharge holes are provided in at least one of the side walls of each of the secondary troughs through so that the portion of the individual primary discharge streams that has accumulated with each second trough may be discharged from the associated secondary trough in individual secondary discharge streams. The liquid distributor further includes splash baffles spaced a preselected distance from at least some of the plurality of liquid discharge holes in the side walls of the secondary troughs to receive at least some of the individual secondary discharge streams and cause a lateral spreading thereof as the individual second discharge streams descend along the splash baffles and drip from lower edges thereof.

In another aspect, the invention is directed to a method of distributing liquid to a layer of mass transfer devices using a liquid distributor as described above.

DETAILED DESCRIPTION

Figure 1:
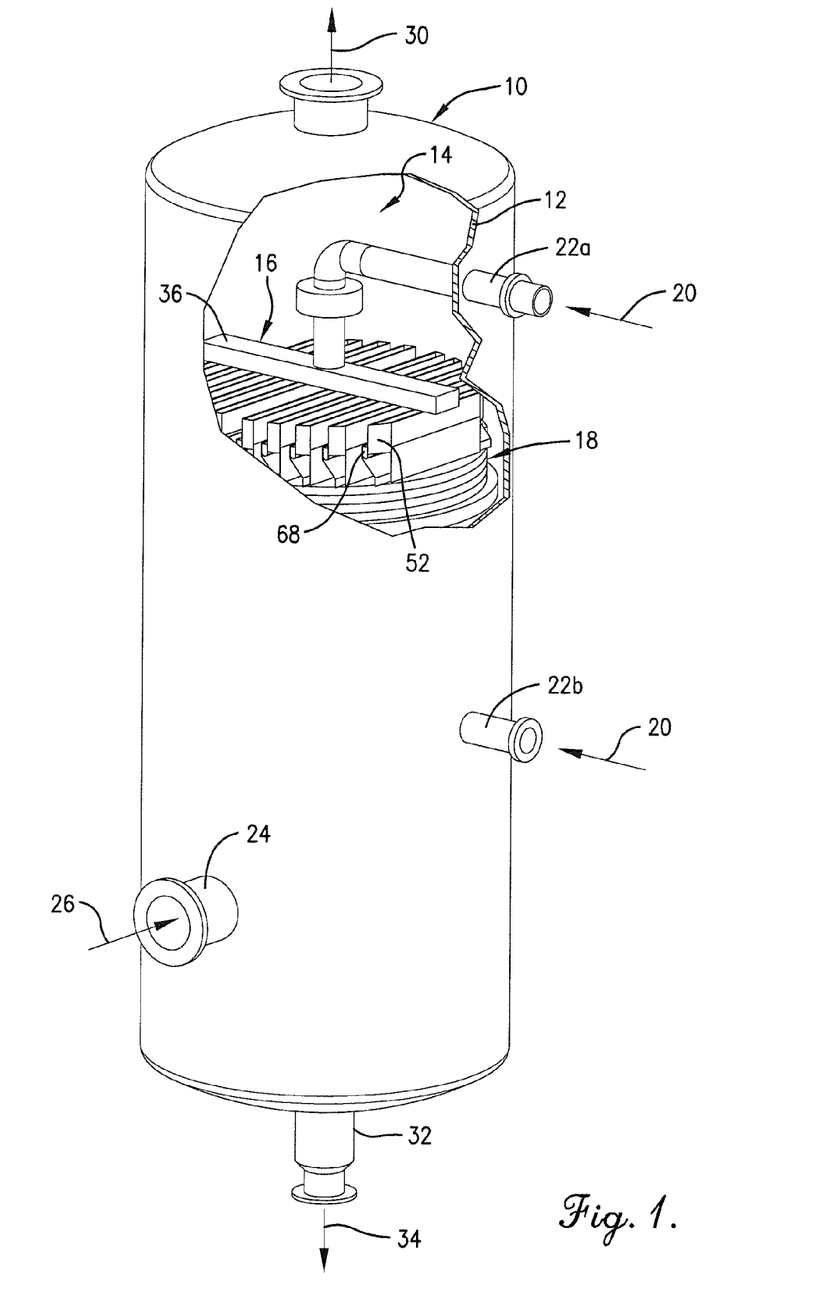
FIG. 1 is a side perspective view of a mass transfer column with portions of a shell of the mass transfer column broken away to show a liquid distributor of the present invention and a layer of mass transfer devices in an open internal region.

Turning now to the drawings in greater detail and initially to FIG. 1, a mass transfer column is represented broadly by the numeral 10 and includes an upright cylindrical shell 12 that defines an open interior region 14. A liquid distributor 16 of the present invention is positioned in the open interior region 14 and is used to distribute a descending liquid stream uniformly across the upper end of one or more layers 18 of mass transfer devices such as structured, grid or random packing material. The liquid stream then descends through the layer(s) 18 of mass transfer devices for mass and/or heat transfer with a vapor stream ascending through the layer(s) 18 of mass transfer devices.

The mass transfer column 10 is of a type used to process liquid and vapor streams to obtain fractionation or other products. Although the shell 12 of the column 10 is shown in a cylindrical configuration, other shapes may be used. The shell 12 is of any suitable diameter and height and is constructed from rigid materials that are preferably inert to or are otherwise compatible with the fluids, temperatures, and pressures present within the column 10.

Liquid streams 20 are directed to the column 10 through feed lines 22a and 22b positioned at appropriate locations along the height of the column 10. Feed line 22a normally carries only liquid and feed line 22b may carry liquid, vapor and a mixture of liquid and vapor. Although only two liquid feed lines 22a and 22b are shown in the drawings for simplicity of illustration, it will be appreciated that additional liquid feed lines may be utilized if desired. Similarly, only one vapor feed line 24 carrying a vapor stream 26 is illustrated, but additional vapor feed lines can be included if necessary or desired for the vapor and liquid processing occurring within the column 10. It will also be appreciated that the vapor stream 26 can be generated within the column 10 rather than being introduced into the column 10 through the feed line 24. The column 10 further includes an overhead line 28 for removing a vapor product or byproduct 30 from the column 10. A bottom stream takeoff line 32 is provided for removing a liquid product or byproduct 34 from the column 10. Other column components such as reflux stream lines, reboilers, condensers, vapor horns, and the like may be present, but are not illustrated because they are convenient in nature and are not believed to be necessary for an understanding of the present invention.

Turning additionally to FIGS. 2-5, one embodiment of the liquid distributor 16 of the present invention includes an elongated central parting box 36 that receives a descending liquid stream, such as the liquid stream 20 that has been delivered by the feed line 22a to the open internal region 14 within the shell 12 of the column 10. The parting box 36 need not receive the liquid stream 20 directly from the feed line 22a. Instead, the liquid stream 20 may first be subjected to one or more processing steps and then collected by a conventional liquid collector (not shown) for subsequent delivery to the parting box 36.

Figure 2:
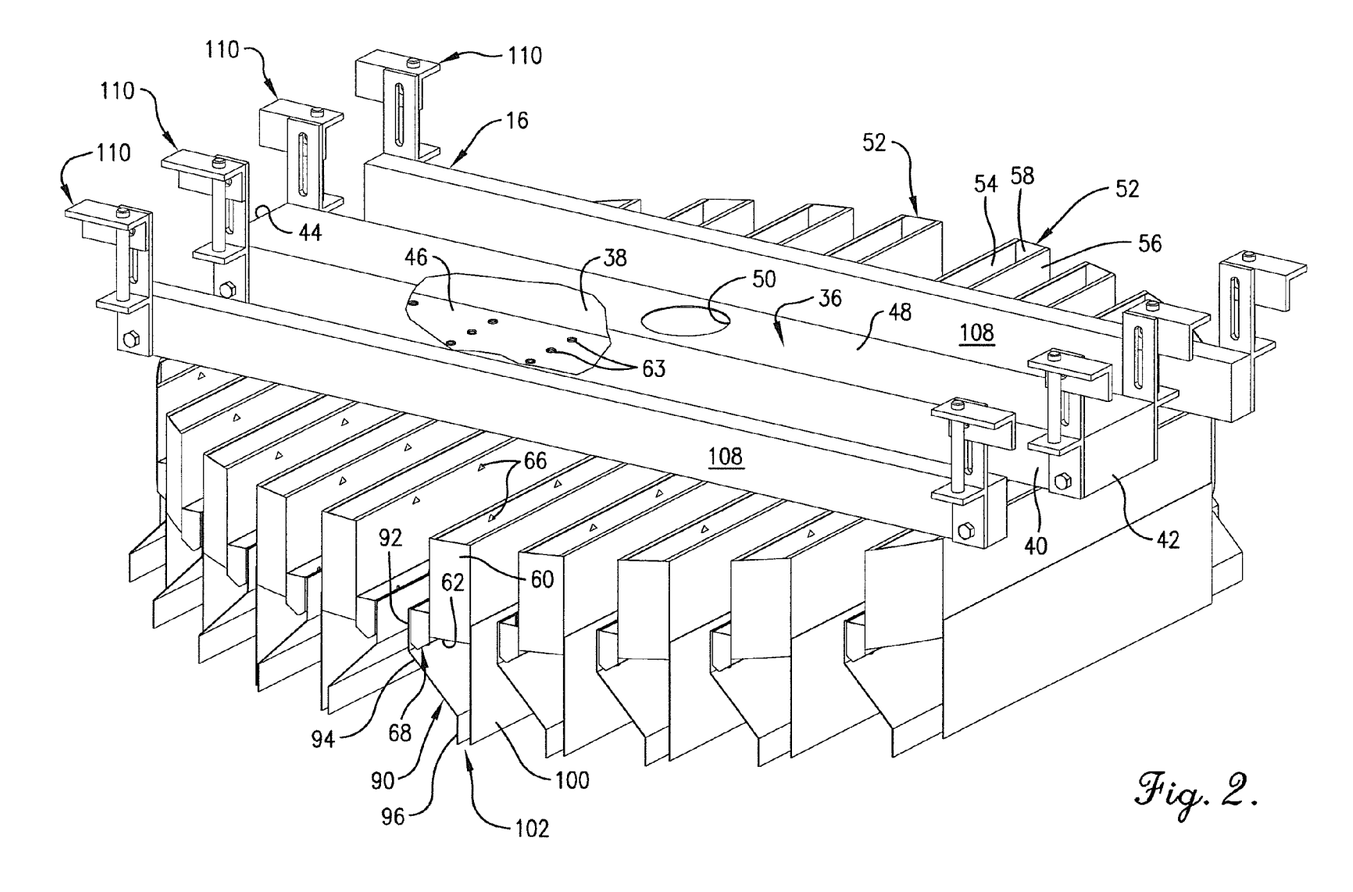
FIG. 2 is a side perspective view of the embodiment of the liquid distributor shown in FIG. 1, with portions of a parting box broken away to show internal details.

In one embodiment, the parting box 36 extends in a first direction along a central horizontal axis or diameter of the shell 12 of the column 10. The parting box 36 has a longitudinal length that is approximately the same as the diameter of the shell 12 or a substantial portion of the diameter. Instead of a single parting box 36, more than one parting box 36 may be used, in which event the parting boxes 36 extend in parallel and co-planar relationship along imaginary chords of the shell 12.

The parting box 36 has a rectilinear cross section with parallel and spaced-apart side walls 38 and 40 that extend along the long dimension of the parting box 36 and parallel and spaced-apart side walls 42 and 44 that extend along the short dimension or ends of the parting box 36. A floor 46 is joined to the lower edges and an optional cover 48 is joined to the upper edges of the side walls 40, 42, 44, and 46. The optional cover 48 includes an opening 50 through which the liquid stream 20 is delivered to the interior of the parting box 36.

The parting box 36 feeds liquid to a plurality of elongated primary troughs 52 that extend in spaced-apart, generally parallel and co-planar relationship to each other. The primary troughs 52 extend along their longitudinal length at an angle, such as an angle of 90°, to the longitudinal length of the parting box 36. The primary troughs 52 each have a longitudinal length sufficient to extend across all or a substantial portion of the cross section of the shell 12 at their locational placement. The number of and lateral spacing between adjacent primary troughs 52 is selected to provide the desired liquid drip-point density in the underlying layer 18 of mass transfer devices.

Figure 3:
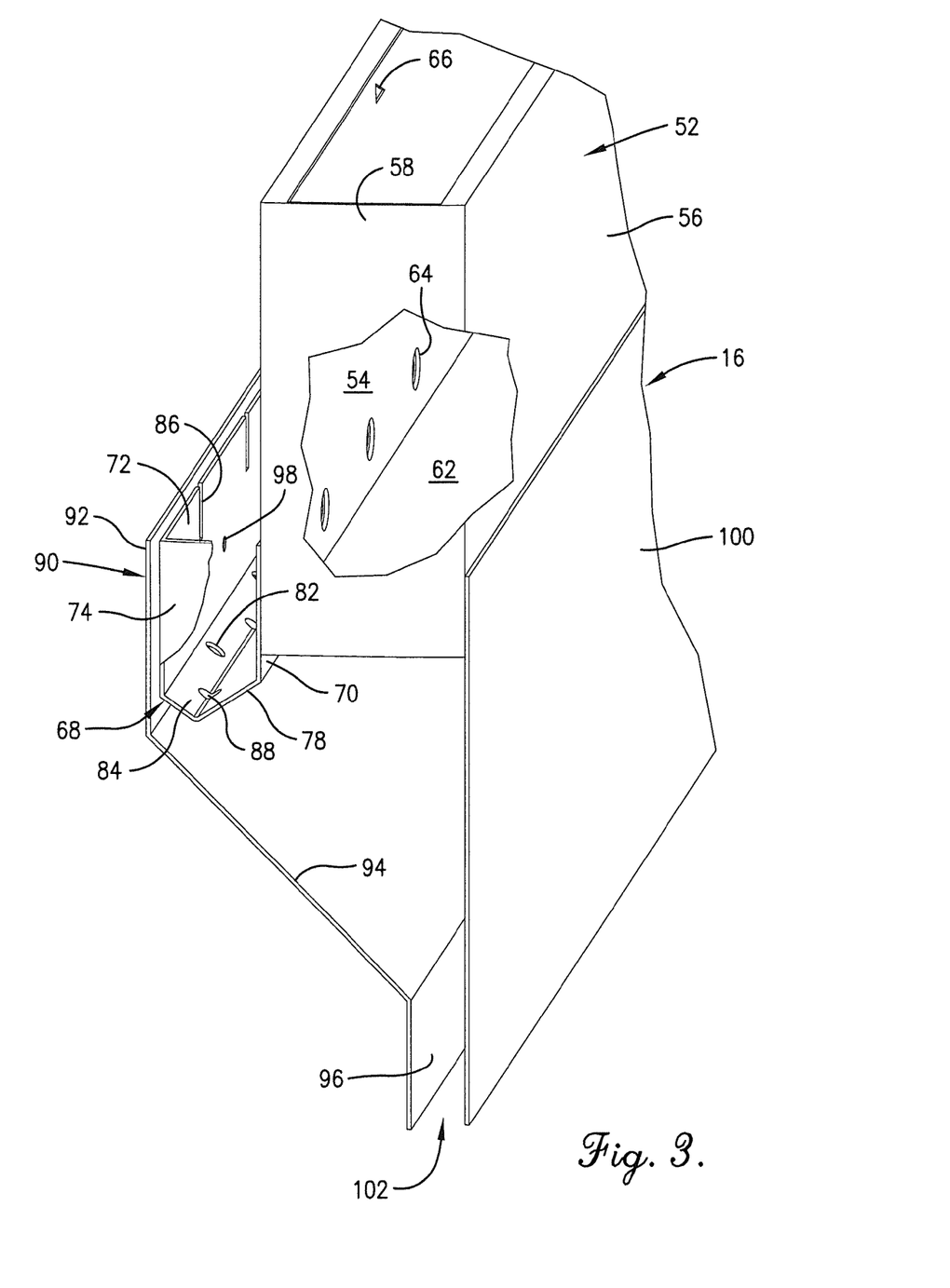
FIG. 3 is an end perspective view of one embodiment of the primary and secondary troughs and splash baffle used in the liquid distributor, with portions of the primary trough broken away to show internal details.

In one embodiment, each primary trough 52 is of generally rectilinear cross section and is constructed with parallel and spaced-apart side walls 54 and 56 that extend along the long dimension of the primary trough 52, parallel and spaced-apart side walls 58 and 60 that extend along the short dimension or ends of the primary troughs 52, and a floor 62 that is joined to the lower edges of the side walls 54, 56, 58, and 60.

In the illustrated embodiment, the parting box 36 is positioned on top of the primary troughs 52 and the liquid in the parting box 36 is delivered to the interior of the primary troughs 52 through openings 63 positioned in the floor 46 of the parting box 36. Openings (not shown) may be provided in the side walls 38 and 40 of the parting box 36 to provide an additional or alternative route for liquid to exit the parting box 36 and flow downwardly into the primary troughs 52.

In another embodiment, the parting box 36 and the primary troughs 52 may be positioned in generally co-planar relationship with the primary troughs 52 extending outwardly from the side walls 38 and 40 of the parting box 36. In this embodiment, openings are provided in the side walls 38 and 40 of the parting box 36 to allow liquid to flow from the parting box 36 to the primary troughs 52.

A plurality of liquid discharge holes 64 are provided at the same elevation above the floor 62 in one or both of the longer side walls 54 and 56 of each primary trough 52. The liquid discharge holes 64 can be of any desired shape, such as circular, triangular or vertically elongated. The size, number and spacing of the liquid discharge holes 64 are selected to accommodate the designed volumetric flow rate of liquid into the primary troughs 52 so that liquid does not overflow the top of the primary troughs 52 during normal operational conditions. Overflow holes 66 or slots may be provided in the side walls 54 and 56 at a level above the liquid discharge holes 64 to allow for the controlled discharge of excess liquid that accumulates within the primary troughs 52 when the liquid flow rate into the primary troughs 52 exceeds the flow capacity of the liquid discharge holes 64.

Figure 4:
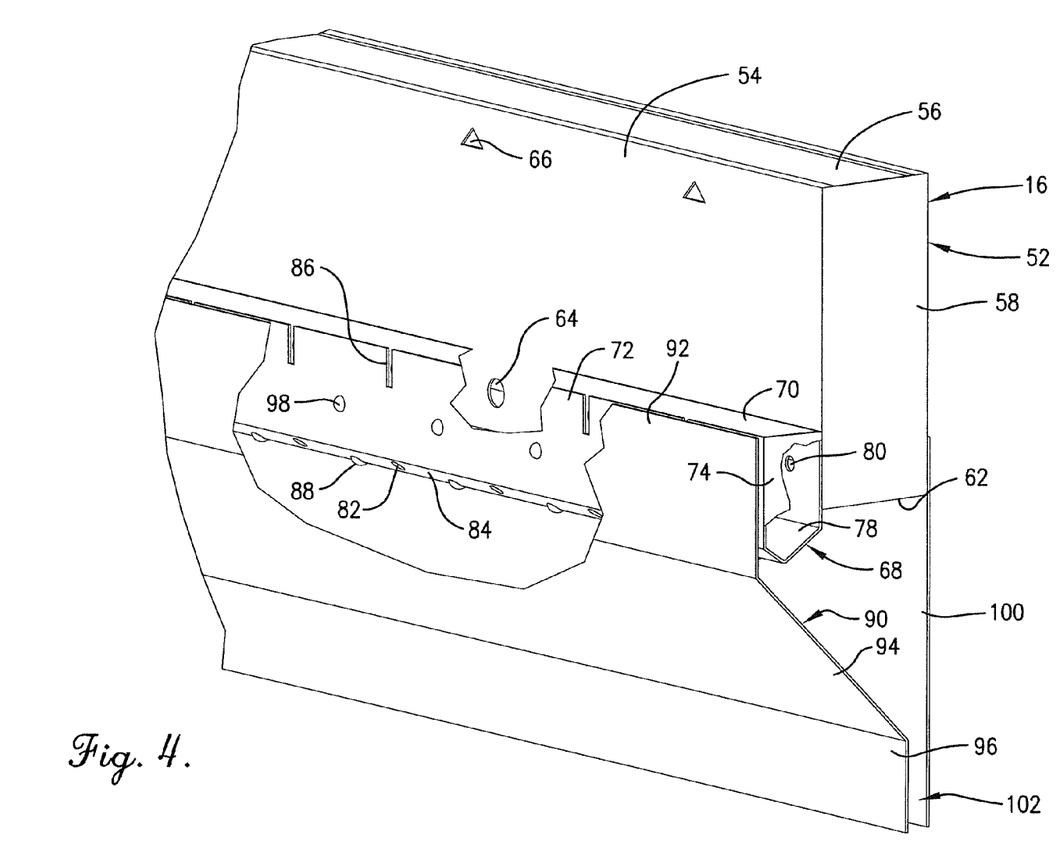
FIG. 4 is a front perspective of the embodiment of the primary and secondary troughs and splash baffle shown in FIG. 3, with portions of the splash baffle and secondary trough broken away.

Each primary trough 52 is paired with a secondary trough 68 that is positioned to receive liquid exiting the primary trough 52 through the liquid discharge holes 64 in the side wall 54 or side wall 56. When both of the side walls 54 and 56 of the primary trough 52 contain liquid discharge holes 64, secondary troughs 68 are positioned along both of the side walls 54 and 56 or a single secondary trough 68 is positioned to receive liquid from the liquid discharge holes 64 in both of the side walls 54 and 56. Each secondary trough 68 is generally rectilinear in cross section and has a longitudinal length that is the same or approximately the same as that of the paired primary trough 52. The secondary troughs 68 each have spaced-apart and parallel side walls 70 and 72 that extend along the long dimension of the secondary troughs 68, spaced-apart and parallel side walls 74 and 76 that extend along the short dimension or ends of the secondary troughs, and a floor 78 that is joined to a lower edge of the side walls 70, 72, 74, and 76.

In one embodiment, the side wall 70 of the secondary trough 68 that faces and is adjacent the side wall 54 or 56 of the primary trough 52 having the liquid discharge holes 64 is in contact with and joined to the side wall 54 or 56 of the primary trough 52. In another embodiment, the side wall 70 of the secondary trough 68 is closely spaced from the side wall 54 or 56 of the primary trough 52 by a distance that still permits liquid exiting from the liquid discharge holes 64 to enter the paired secondary trough 68. The side wall 70 of the secondary trough has inlet holes 80 aligned with the liquid discharge holes 64 in the side wall 54 or 56 of the primary trough 52. Alternatively, the top edge of the side wall 70 is positioned below the level of the liquid discharge holes 64 in the side wall 54 or 56 of the primary trough 52 so that liquid exiting the primary trough 52 through the liquid discharge holes 64 enters the secondary trough 68 through is its open top.

The side wall 72 of each secondary trough 52 that is opposite from the side wall 70 that is adjacent to the primary trough 52 has a plurality of liquid discharge holes 82. The liquid discharge holes 82 can be of any desired shape, such as circular, triangular or vertically elongated. The size, number and spacing of the liquid discharge holes 82 are selected to accommodate the designed volumetric flow rate of liquid into the secondary troughs 68 so that liquid does not overflow the top of the secondary troughs 68 during normal operational conditions. The liquid discharge holes 82 are each positioned at the desired and normally the same elevation in the side wall 72. In the illustrated embodiment, the liquid discharge holes 82 are located in a lower portion 84 of the side wall 72 that is bent away from a vertical plane at a preselected angle toward the opposite side wall 70 and the primary trough 52. The floor 78 slopes downwardly from the opposite side wall 70 toward the lower portion 84 of the side wall 72 so that the floor 78 directs liquid toward the liquid discharge holes 82. Overflow holes 86 or slots may be provided in the side wall 72 at a level above the liquid discharge holes 82 to allow for the controlled discharge of excess liquid that accumulates within the secondary troughs 68 when the liquid flow rate into the secondary troughs 68 exceeds the flow capacity of the liquid discharge holes 82.

A plurality of spaced-apart dimples 88 extend downwardly on an undersurface of the floor 78 and the lower portion 84 of the side wall 72. The dimples 88 are placed between adjacent liquid discharge holes 82 to create drip points that interrupt the longitudinal flow of liquid along the undersurface of the floor 78 and the lower portion 84 of the side wall 72. The liquid discharge holes 82 can also be formed by punching to create a slight burr surrounding the liquid discharge holes 82 to reduce the opportunity for liquid to track along the outer surface of the side wall 72.

A splash baffle 90 is positioned adjacent each secondary trough 52 at a location to receive the liquid that exits the secondary trough 52 through the liquid discharge holes 82. The splash baffle 90 extends longitudinally along all or substantially all of the longitudinal length of the secondary trough 52. In one embodiment, the splash baffle 90 has a planar upper segment 92 that extends vertically along the side wall 72, a planar intermediate segment 94 that is angled to underlie the secondary trough, and a planar lower segment 96 that extends vertically downward below the associated primary trough 52 and has a serrated bottom edge. Spacer dimples 98 that extend outwardly from the side wall 72 of the secondary trough 68 are in contact with the upper segment 92 of the splash baffle 90 to create a slight spacing between the upper segment 92 and the side wall 72.

The upper segment 92 of the splash baffle 90 extends a preselected distance below the secondary trough 68 so that the intermediate portion 94 of the splash baffle 90 is spaced a preselected distance below the liquid discharge holes 82. This spacing between the intermediate portion 94 and the liquid discharge holes 82 creates an outlet clearance for liquid to exit the liquid discharge holes 82. In embodiments where the lower portion 84 of the side wall 72 is not bent away from the vertical, additional spacing must be provided between the liquid discharge holes 82 and the upper portion of the splash baffle 90 to provide the necessary outlet clearance.

A planar vertical baffle 100 extends downwardly from the side wall 56 of each primary trough 52 a sufficient distance so that its lower region is spaced horizontally from the lower segment 96 of the splash baffle 90 to form an elongated liquid discharge outlet 102 that underlies the longitudinal length of the primary trough 52. In embodiments where secondary troughs 68 are positioned along both of the side walls 54 and 56 of the primary trough 52, the baffle 100 is not used and the liquid discharge outlet 102 is formed by the lower segments 96 of the two splash baffles 90 that are mirror images of each other.

The secondary troughs 68 may be in the same plane as the primary troughs 52 or the secondary trough 68 may be displaced somewhat from the plane of the primary troughs 52 so that at least a portion of the secondary troughs 68 extends below the primary troughs 52. The internal volume of the secondary trough 68 in one embodiment is less than that of the primary troughs 52. The total liquid flow capacity of the liquid discharge holes 64 in the side walls 54 and/or 56 of the primary troughs 52 may be the same, greater than, or less than that of the liquid discharge holes 82 in the side walls 72 of the secondary troughs 68. Normally, however, the number of liquid discharge holes 82 in the side walls 72 of the secondary troughs 68 is greater than the number of liquid discharge holes 64 in the side walls 54 and/or 56 of the primary troughs 52 so that the secondary troughs 68 act as flow multipliers to increase the lateral spreading of the liquid on the splash baffles 90.

As shown in FIG. 2, two beams 108 are equally spaced on opposite sides of the parting box 36 and are welded or otherwise secured to the top edges of the primary troughs 52. The beams 108 support and align the primary troughs 52. Support clips 110 are positioned at the ends of the beams 108 and the parting box 36 and may be secured to a support ring (not shown) or other structure that is attached to the shell 12 of the column 10. Other methods of supporting the liquid distributor 16, such as grid supports placed on the underlying layer 18 of mass transfer devices, can be used in place of or in addition to the support clips 110. The beams 108 and support clips 110 are not shown in FIG. 1 to simplify that illustration of the liquid distributor 16.

Figure 5:
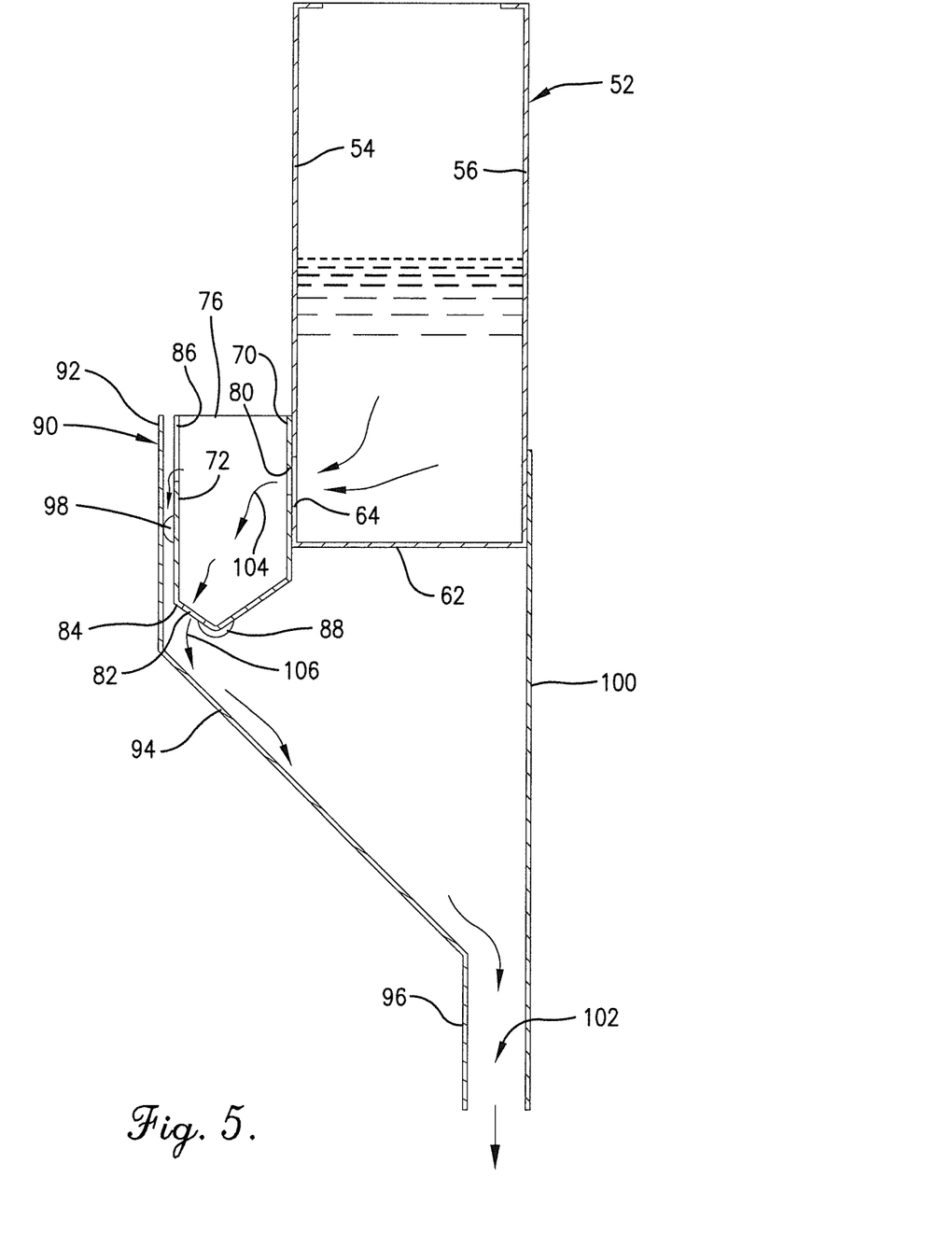
FIG. 5 is an end elevation view illustrating the liquid flow through the embodiment of the primary and secondary troughs shown in FIGS. 3 and 4.

As can be seen with reference to FIG. 5, liquid that has been delivered to one of the primary troughs 52 by the parting box 36 (not shown in FIG. 5), accumulates within the primary trough 52. When the level of accumulated liquid reaches or exceeds the elevation of the liquid discharge holes 64 in the side wall 54, the liquid is discharged into the secondary trough 68 through the liquid discharge holes 64 and through the inlet holes 80. The liquid is discharged as individual primary liquid streams designed by the arrow 104. The liquid from the individual primary liquid streams 104 accumulates within the secondary troughs 68 and is directed by the floor 78 to the liquid discharge openings 82 in the lower portion 84 of side wall 72. The liquid is then discharged from the secondary troughs 68 through the liquid discharge openings 82 as individual secondary liquid streams designed by the arrow 106. Any overflow from the secondary troughs 68 exits through the overflow holes or slots 86 and descends in the spacing between the side wall 72 and the upper segment 92 of the splash baffle 90.

The individual secondary liquid streams 106 are directed against the splash baffle 90 and then descend and spread laterally along the surface of the splash baffle 90. In one embodiment, the surface of the splash baffle 90 is treated with surface texturing to facilitate the lateral spread of the liquid. In another embodiment, the surface texturing is provided on a thinner layer of material that is more easily worked and is then laminated onto the surface of the splash baffle 90. Once the liquid reaches the lower discharge outlet 102, it forms a continuous curtain of liquid that drips or flows into the underlying layer 18 of mass transfer devices (not shown in FIG. 5).

It can be seen that the use of the secondary troughs 68 allows larger liquid discharge holes 64 that are spaced further apart to be provided in the side walls 54 and/or 56 of the primary troughs 52 even in applications where the liquid distributor 16 is designed for low liquid flow conditions. The larger liquid discharge holes 64 are advantageous in that they are less prone to becoming plugged, such as by debris or scale. The secondary troughs 68 serve to cause greater lateral spreading of the liquid on the splash baffles 90 than would otherwise result from flowing the liquid directly from the primary baffles 52 onto the splash baffles 90.

Figure 6:
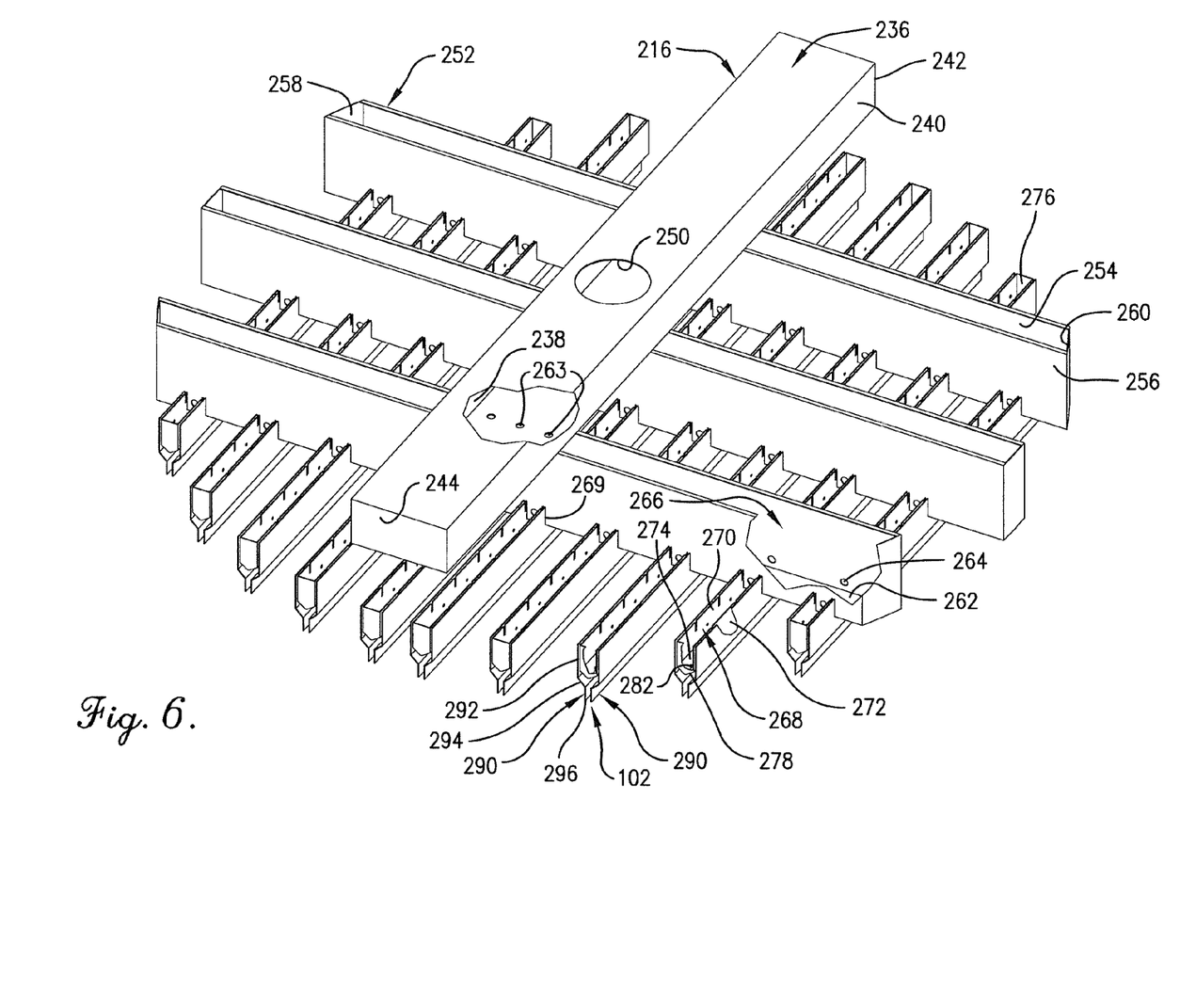
FIG. 6 is a top perspective view of an alternate embodiment of the liquid distributor.

Turning now to FIG. 6, another embodiment of the liquid distributor of the present invention is shown and is designated generally by the numeral 216. Liquid distributor 216 has many of the same components as the liquid distributor 16 previously described and the same reference numerals with the prefix "2" are used to designate like components. Liquid distributor comprises a parting box 236 constructed in the same manner as the parting box 36 previously described and primary troughs 252 that are the same as primary troughs 52. The liquid distributor 216 further comprises secondary troughs 268 that are generally of the same constructions as secondary troughs 68 except they extend perpendicular to the primary troughs 252 and liquid does not feed into the secondary troughs 268 through inlet holes in a side wall 270 of the secondary troughs 268 as is the case with the secondary troughs 68 of the first embodiment.

Instead, in one embodiment, liquid feeds into the secondary troughs 268 through an open end of the secondary trough 268 that abuts a side wall 254 or 256 of the primary trough 252. Liquid discharge holes 264 in the side walls 254 and 256 of the primary trough 252 allow the liquid to exit the primary troughs 252 as individual primary liquid streams and enter the associated secondary troughs 268. In the illustrated embodiment, a cutout 269 is provided in the side walls 70 and 72 of each secondary trough 268 to receive the primary trough 252 so that liquid is additionally able to enter the secondary troughs 268 through holes (not shown) in a floor 262 of each primary trough 252. The liquid then exits the secondary troughs 268 and impacts and flows down splash baffles 290 in the same manner as previously described for delivery as a continuous curtain of liquid into an underlying layer (not shown) of mass transfer devices. Two splash baffles 290 are provided for each secondary trough 268 when liquid is discharged from both side walls 270 and 272. When liquid is only discharged through one of the side walls 270 or 272, a single splash baffle 290 is used in combination with a planar baffle, such as the baffle 100 used in the liquid distributor 16 described above.

Because the secondary troughs extend at a perpendicular or other angle to the primary troughs 252 in the liquid distributor 216, the number of secondary troughs 268 can be selected independently of the number of primary troughs 252. In both embodiments of the liquid distributor 16 and 216, separate secondary troughs 68 and 268 may be associated with each of the liquid discharge holes 64 and 264 in the associated primary troughs 52 and 252.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A liquid distributor for receiving and distributing a liquid stream, said liquid distributor comprising:
   a plurality of elongated primary troughs positioned in side-by-side and generally parallel relationship, each of said primary troughs having spaced apart side walls interconnected by a floor for receiving and allowing the accumulation of a portion of the liquid stream within each primary trough;
   a plurality of liquid discharge holes in at least one of the side walls of each of said primary troughs through which the portion of the liquid stream that has accumulated within each primary trough may be discharged from the associated trough in individual primary discharge streams;
   a plurality of secondary troughs each having spaced apart side walls interconnected by a floor for receiving and allowing the accumulation of a portion of the primary discharge streams within each secondary trough, each secondary trough being positioned adjacent and in the same plane as one of the primary troughs at a location to receive at least some of the individual primary discharge streams from said one of the primary troughs;

a plurality of liquid discharge holes in at least one of the side walls of each of the secondary troughs through which the portion of the individual primary discharge streams that has accumulated within each secondary trough may be discharged from the associated secondary trough in individual secondary discharge streams; and splash baffles spaced a preselected distance from at least some of the plurality of liquid discharge holes in the side walls of the secondary troughs to receive at least some of the individual secondary discharge streams and cause a lateral spreading thereof as the individual second discharge streams descend along the splash baffles and drip from lower edges thereof.

2. The liquid distributor of claim 1, wherein each of said secondary troughs extends parallel with and is connected to or closely spaced from one of said primary troughs.

3. The liquid distributor of claim 1, wherein each of said secondary troughs extends at an angle to one of said primary troughs.

4. The liquid distributor of claim 1, wherein each of said secondary troughs extends perpendicularly to one of said primary troughs.

5. The liquid distributor of claim 1, wherein said splash baffles include surface texturing to facilitate said lateral spreading of the individual secondary discharge streams.

6. The liquid distributor of claim 1, wherein each of said splash baffles comprises a support sheet and a texturized sheet connected to the support sheet.

7. The liquid distributor of claim 1, wherein an undersurface of said floors of the second troughs contains structures to inhibit the flow of liquid along said undersurface.

8. The liquid distributor of claim 7, wherein said structures comprise dimples.

9. The liquid distributor of claim 1, including inlet holes in the side walls of the secondary troughs adjacent to the side walls of the primary troughs, said inlet holes being in alignment with the liquid discharge holes in the side walls of the primary troughs.

10. The liquid distributor of claim 1, wherein the side walls of the secondary troughs containing said liquid discharge holes each includes a lower panel that angles toward the associated primary trough, and wherein the liquid discharge holes in the side walls of the secondary troughs are located in said lower panel.

11. The liquid distributor of claim 1, including spacer elements positioned between the side walls of the secondary troughs and the splash baffles.

12. The liquid distributor of claim 11, wherein the spacer elements comprise dimples formed in the side walls of the secondary troughs.

13. The liquid distributor of claim 1, wherein said secondary troughs are positioned along both of the side walls of said primary troughs.

14. The liquid distributor of claim 1, wherein said splash baffles extend longitudinally along all or substantially all of a longitudinal length of the secondary troughs.

15. The liquid distributor of claim 1, wherein one of the side walls in each of the secondary troughs faces and is adjacent one of the side walls of one of the primary troughs and has inlet holes that are aligned with the liquid discharge holes in the adjacent one of the side walls of the one of the primary troughs.

16. The liquid distributor of claim 1, wherein a portion of the secondary troughs extend below the primary troughs.

17. The liquid distributor of claim 1, wherein each of said splash baffles comprises an upper segment that extends along the side wall of the secondary trough having said plurality of discharge holes, an intermediate segment that is angled to underlie the secondary trough, and a lower segment that extends vertically downward below the primary trough that is positioned adjacent the secondary trough.

18. A liquid distributor for receiving and distributing a liquid stream, said liquid distributor comprising:
a plurality of elongated primary troughs positioned in side-by-side and generally parallel relationship, each of said primary troughs having spaced apart side walls interconnected by a floor for receiving and allowing the accumulation of a portion of the liquid stream within each primary trough;
a plurality of liquid discharge holes in at least one of the side walls of each of said primary troughs through which the portion of the liquid stream that has accumulated within each primary trough may be discharged from the associated trough in individual primary discharge streams;
a plurality of secondary troughs each having spaced apart side walls interconnected by a floor for receiving and allowing the accumulation of a portion of the primary discharge streams within each secondary trough, each secondary trough being positioned adjacent and in the same plane as one of the primary troughs at a location to receive at least some of the individual primary discharge streams from said one of the primary troughs;
a plurality of liquid discharge holes in at least one of the side walls of each of the secondary troughs through which the portion of the individual primary discharge streams that has accumulated within each secondary trough may be discharged from the associated secondary trough in individual secondary discharge streams; and
splash baffles spaced a preselected distance from at least some of the plurality of liquid discharge holes in the side walls of the secondary troughs to receive at least some of the individual secondary discharge streams and cause a lateral spreading thereof as the individual second discharge streams descend along the splash baffles and drip from lower edges thereof,
wherein said splash baffles extend longitudinally along all or substantially all of a longitudinal length of the secondary troughs,
wherein each of said splash baffles comprises an upper segment that extends along the side wall of the secondary trough having said plurality of discharge holes, an intermediate segment that is angled to underlie the secondary trough, and a lower segment that extends vertically downward below the primary trough that is positioned adjacent the secondary trough.

19. A liquid distributor for receiving and distributing a liquid stream, said liquid distributor comprising:
a plurality of elongated primary troughs positioned in side-by-side and generally parallel relationship, each of said primary troughs having spaced apart side walls interconnected by a floor for receiving and allowing the accumulation of a portion of the liquid stream within each primary trough;
a plurality of liquid discharge holes in at least one of the side walls of each of said primary troughs through which the portion of the liquid stream that has accumulated within each primary trough may be discharged from the associated trough in individual primary discharge streams;
a plurality of secondary troughs each having spaced apart side walls interconnected by a floor for receiving and allowing the accumulation of a portion of the primary discharge streams within each secondary trough, each secondary trough being positioned adjacent one of the primary troughs at a location to receive at least some of the individual primary discharge streams from said one of the primary troughs, each of the secondary troughs being in the same plane as the one primary trough or displaced from the same plane so that a portion of the secondary trough extends below the one primary trough;

a plurality of liquid discharge holes in at least one of the side walls of each of the secondary troughs through which the portion of the individual primary discharge streams that has accumulated within each secondary trough may be discharged from the associated secondary trough in individual secondary discharge streams; and splash baffles spaced a preselected distance from at least some of the plurality of liquid discharge holes in the side walls of the secondary troughs to receive at least some of the individual secondary discharge streams and cause a lateral spreading thereof as the individual second discharge streams descend along the splash baffles and drip from lower edges thereof, wherein said splash baffles extend longitudinally along all or substantially all of a longitudinal length of the secondary troughs.

20. A liquid distributor for receiving and distributing a liquid stream, said liquid distributor comprising:

a plurality of elongated primary troughs positioned in side-by-side and generally parallel relationship, each of said primary troughs having spaced apart side walls interconnected by a floor for receiving and allowing the accumulation of a portion of the liquid stream within each primary trough;

a plurality of liquid discharge holes in at least one of the side walls of each of said primary troughs through which the portion of the liquid stream that has accumulated within each primary trough may be discharged from the associated trough in individual primary discharge streams;

a plurality of secondary troughs each having spaced apart side walls interconnected by a floor for receiving and allowing the accumulation of a portion of the primary discharge streams within each secondary trough, each secondary trough being positioned adjacent one of the primary troughs at a location to receive at least some of the individual primary discharge streams from said one of the primary troughs, each of the secondary troughs being in the same plane as the one primary trough or displaced from the same plane so that a portion of the secondary trough extends below the one primary trough;

a plurality of liquid discharge holes in at least one of the side walls of each of the secondary troughs through which the portion of the individual primary discharge streams that has accumulated within each secondary trough may be discharged from the associated secondary trough in individual secondary discharge streams; and splash baffles spaced a preselected distance from at least some of the plurality of liquid discharge holes in the side walls of the secondary troughs to receive at least some of the individual secondary discharge streams and cause a lateral spreading thereof as the individual second discharge streams descend along the splash baffles and drip from lower edges thereof, wherein said splash baffles extend longitudinally along all or substantially all of a longitudinal length of the secondary troughs, wherein each of said splash baffles comprises an upper segment that extends along the side wall of the secondary trough having said plurality of discharge holes, an intermediate segment that is angled to underlie the secondary trough, and a lower segment that extends vertically downward below the primary trough that is positioned adjacent the secondary trough.

\* \* \* \* \*